(12) United States Patent
Lilja et al.

(10) Patent No.: US 6,438,356 B1
(45) Date of Patent: Aug. 20, 2002

(54) METHOD FOR MINIMIZING EFFECT OF INTERFERENCE, AND RADIO SYSTEM

(75) Inventors: Harri Lilja, Oulu; Seppo Hämäläinen, Espoo, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/974,828

(22) Filed: Oct. 12, 2001

Related U.S. Application Data

(63) Continuation of application No. PCT/FI01/00227, filed on Mar. 8, 2001.

(30) Foreign Application Priority Data

Mar. 9, 2000 (FI) .................................................. 2000539

(51) Int. Cl.$^7$ ................................................ H04B 1/00
(52) U.S. Cl. ........................... 455/63; 455/522; 455/69; 370/318
(58) Field of Search ........................... 455/527, 69, 63, 455/68, 70; 370/318

(56) References Cited

U.S. PATENT DOCUMENTS

| 5,669,066 A | 9/1997 | Borg et al. |
| 5,838,671 A | 11/1998 | Ishikawa et al. |
| 5,859,838 A | 1/1999 | Soliman |
| 6,073,026 A | 6/2000 | Kim et al. |
| 6,075,974 A * | 6/2000 | Saints et al. .................. 455/69 |
| 6,330,450 B1 * | 12/2001 | Wallstedt et al. ........... 455/447 |

FOREIGN PATENT DOCUMENTS

WO    WO 00/41466    7/2000

* cited by examiner

*Primary Examiner*—Thanh Cong Le
*Assistant Examiner*—Alan T. Gantt
(74) *Attorney, Agent, or Firm*—Pillsbury Winthrop LLP

(57) ABSTRACT

A method for minimizing the effect of interference in a radio system including a radio system comprises a measuring means which is adapted to measure the transmission frequency of the power control requests transmitted by a base transceiver station to each subscriber terminal. The radio system comprises an attenuation means which is adapted to alter the attenuation of the signals arriving at the reception band of the base transceiver station and which are transmitted by the subscriber terminal, the transmission frequency of power control requests transmitted to which has exceeded a predefined transmission frequency of power control requests.

26 Claims, 5 Drawing Sheets

METHOD FOR MINIMIZING EFFECT OF INTERFERENCE, AND RADIO SYSTEM

This application is a Continuation of International Application PCT/FI01/00227 filed on Mar. 8, 2001 which designated the U.S. and was published under PCT Article 21(2) in English.

FIELD OF THE INVENTION

The invention relates to a method for minimizing the effect of interference in a radio system which comprises at least one subscriber terminal and a base transceiver station which receives signals from said subscriber terminal, and in which method power control requests are transmitted to said subscriber terminal.

BACKGROUND OF THE INVENTION

In practice, transmitters used in radio networks are non-linear, and a part of a signal ends up outside the frequency band allocated to the transmission. When a signal ends up outside the frequency band allocated to it, it causes interference which is called adjacent channel interference (ACI).

The non-linearity of a transmitter is closely related to the properties of the amplifier of the transmitter. In general, it can be said that linear amplifiers cause minor interference to adjacent frequency bands, but the performance of the amplifiers is relatively low. Instead, non-linear amplifiers cause more interference in relation to the non-linear amplifiers. However, non-linear amplifiers have the advantage that they provide a better performance than the linear amplifiers.

Adjacent channel interference causes problems especially in wide-band systems, such as the WCDMA (wide-band code division multiple access) system. For instance, the WDCMA specification includes a maximum value for interference caused by the adjacent channel.

FIG. 1 shows a curve which describes the increase in noise in a CDMA system in relation to the system load. The load is proportional to the number of subscriber terminals in the system. The curve is obtained by the following formula:

$$r = 10\log\left(\frac{1}{1-\eta}\right), \quad (1)$$

wherein r is the amount of noise exceeding thermal noise,

η indicates the degree of loading of the system.

The load of the CDMA system as a function of the users can be calculated as follows:

$$\eta = \frac{\left(\frac{n}{F} - 1\right)d}{G_p/(E_b/N_0)}, \quad (2)$$

wherein $G_p$ is the processing gain, d indicates the voice activity,

F is the reuse coefficient of the frequency, n indicates the number of users, $E_b/N_o$ indicates the ratio of the energy of the received bit to the thermal noise density.

The coefficient F obtains the value 1 when this concerns a separate cell. The coefficient F can obtain the value 0.9, for instance, when this concerns a typical micro cell. When this concerns a typical macro cell, the coefficient F obtains the value 0.67, for instance.

When the formulas (1) and (2) are combined, the following formula is obtained for the amount of noise exceeding thermal noise:

$$r = 10\log\left(\frac{1}{1-\frac{((n/F)-1)d}{G_p/(E_p/N_o)}}\right) \quad (3)$$

FIG. 2 shows curves 2a, 2b and 2c defined for different cell types, obtained by the formula (3), when typical values are inserted in the variables of the formula. The curve 2a shows a load curve of a macro cell, the curve 2b shows a load curve of a micro cell, and the curve 2c shows a load curve of a separate cell. FIG. 2 shows that in a micro cell a higher noise is allowed than in a macro cell.

FIGS. 1 and 2 show that when the degree of loading- is between 0.5 and 0.8, the noise increase is in the range of 3 to 6 dB. When the degree of loading is in the above-mentioned range, a small increase in the degree of loading only causes a small increase in the amount of noise. Because the curve rises steeply, it is easy to see that if the degree of loading is higher than the high value of the above-mentioned range, even a small increase in the degree of loading causes a high increase in the amount of noise. The higher the load in the system, the higher the number of subscriber terminals that need to increase their transmission power. However, an increase in transmission power further increases the amount of noise in the network, and the system may become unstable.

In radio networks, an admission control algorithm is used to ensure that for a call there are sufficient resources which allow a sufficiently good signal-to-interference (SIR) ratio and bit rate for the call signal. The admission control algorithm is, for instance, applied when a subscriber terminal begins to establish a connection in a new cell. The admission control algorithm can also be applied during handover.

The admission control algorithm is applied separately in the uplink and downlink directions, especially when the traffic volumes of the different directions differ a great deal from each other. When the algorithm is activated, call set-up can be prevented.

Radio networks also use a load control algorithm which is used to try and maintain the network resources in a pre-defined range of use. The admission control and load control algorithms contain a parameter indicating noise increase. The parameter and, at the same time, the algorithm can, for instance, be activated when the amount of noise exceeds a predefined noise limit.

Applying the load control algorithm requires constant processing in which interference is monitored. The algorithm is used in defining the load factor. If a predefined load factor value is exceeded, the network reduces the bit rate of the users whose service contract allows the reduction of bit rate. In addition, the network delays transmission of the users who have no requirements with respect to delay. The network can also interrupt low-priority calls.

In some situations, the network can, in principle, drop all its calls. Calls have to be dropped when the noise level remains too high even after all available means have been used to reduce the noise level.

When the network is underloaded, the load control algorithm increases bit rates of those users who are able to process higher bit rates. Increasing or reducing bit rates can be done in order of priority, for instance.

Let us now examine the situation in FIG. 3, which clearly shows the problem which arises as a result of using an adjacent channel. In the figure, a subscriber terminal MS1 is connected to a base transceiver station BTS1. The connection uses a frequency F3 in the uplink direction (MS1 → BTS1). The terminal MS1 is, however, close to another base transceiver station BTS2 which receives on a frequency F4 from a terminal MS2 of its own.

If the frequencies F3 and F4 are adjacent frequency bands in the frequency range, the base transceiver station BTS2 will experience the transmission of the terminal MS1 as adjacent channel interference, because the selectivity of the receiver in the base transceiver station BTS2 is not ideal. Problems would arise even though the receiver did operate selectively, because the signal of the adjacent channel also spreads to the reception band of a selectively operating receiver. The problem situation caused by the interference is especially difficult when BTS1 and BTS2 are base transceiver stations of different network operators, for instance, since then the terminal MS1 cannot make a handover to the base transceiver station BTS2.

BRIEF DESCRIPTION OF THE INVENTION

It is thus an object of the invention to provide a method for minimizing the effect of interference and a radio system so as to reduce the above-mentioned problems. This is achieved by a method of the type as claimed in the preamble, which is characterized by separately measuring the transmission frequency of power control requests transmitted to a subscriber terminal, and when the transmission frequency of the power control requests transmitted to the subscriber terminal exceeds a predefined transmission frequency of power control requests, by altering the attenuation of signals arrived at a base transceiver station at least in the case of the signals which are transmitted from the above-mentioned subscriber terminal to the base transceiver station.

The object is also achieved by a method of the type as claimed in the preamble, which is characterized in that for executing the method, there are two method step groups, of which at least one is executed in the method; in the first method step group: the transmission frequency of power control requests transmitted to each subscriber terminal is measured separately, and when the transmission frequency of power control requests transmitted to the subscriber terminal exceeds a predefined transmission frequency of power control requests, the attenuation of signals arrived at a base transceiver station is altered at least in the case of the signals which are transmitted from the above-mentioned subscriber terminal to the base transceiver station; in the second method step group: the size of interfering signals arrived at the reception band of the base transceiver station is defined, the activation threshold of the algorithms controlling the operation of the radio system is changed when the measuring result obtained from measuring the interfering signals exceeds a pre-set limit value.

Further, the object is achieved by a method of the type as claimed in the preamble, which is characterized by separately measuring the transmission frequency of power control requests transmitted to each subscriber terminal, increasing the attenuation of signals received by a base transceiver station until one subscriber terminal can no longer receive the service provided by the base transceiver station, and thereafter reducing the attenuation of the signals arriving at the base transceiver station from the subscriber terminal, the signals being those arriving at the base transceiver station from the subscriber terminal, the transmission frequency of power boost requests transmitted to which exceeds a predefined transmission frequency of power boost requests.

The invention also relates to a radio system which comprises at least one subscriber terminal and a base transceiver station which is adapted to receive signals from said subscriber terminal and which base transceiver station is adapted to transmit power control requests to said subscriber terminal.

The system of the invention is characterized in that the radio system comprises a measuring means which is adapted to measure the transmission frequency of power control requests transmitted to the subscriber terminal, and an attenuation means which is adapted to alter the attenuation of signals arriving at the reception band of the base transceiver station and transmitted by the subscriber terminal, the transmission frequency of power control requests transmitted to which has exceeded a predefined transmission frequency of power control requests.

The system of the invention is also characterized in that the radio system has two groups of means available to it, the radio system comprising at least one of them at each time; and the first group of means comprises: a measuring means which is adapted to measure the transmission frequency of power control requests transmitted by the base transceiver station to each subscriber terminal, and an attenuation means which is adapted to alter the attenuation of signals arriving at the reception band of the base transceiver station and transmitted by the subscriber terminal, the transmission frequency of power control requests transmitted to which has exceeded a predefined transmission frequency of power control requests; and the second group of means comprises: a measuring means which is adapted to define the size of interfering signals arrived at the reception band of the base transceiver station, a control means which is adapted to change the activation threshold of the algorithms used in the radio system, when the result obtained from the above-mentioned definition of interfering signals exceeds a pre-set limit value.

The system of the invention is further characterized in that the radio system comprises a measuring means which is adapted to measure the transmission frequency of power control requests transmitted to the subscriber terminal, and an attenuation means which is adapted to increase the attenuation of the signals received by the base transceiver station until one subscriber terminal can no longer receive the service provided by the base transceiver station, and the attenuation means is adapted to reduce the attenuation of the signals transmitted from the subscriber terminal to the base transceiver station, the signals being those arriving at the base transceiver station from the subscriber terminal, the transmission frequency of power boost requests transmitted to which by the base transceiver station has exceeded a predefined transmission frequency of power boost requests.

Preferred embodiments of the invention are disclosed in the dependent claims.

The invention is based on altering the operation point of a base transceiver station suffering from interference by taking the load of the base transceiver station into account. In addition, the sensitivity of the base transceiver station is improved, which station during a given time transmits power boost requests, the number of which exceeds a pre-set limit.

The method and radio system of the invention provide several advantages. The operation point of a base transceiver station suffering from interference is altered by taking into consideration especially the load caused by the adjacent channel to the base transceiver station, in which case the effect of the interference on the base transceiver station can be reduced. The effect of the interference can be reduced in a relatively simple manner. The reduction requires that the receiver of the base transceiver station has an attenuation means which, when altering its attenuation value, takes into consideration the number of power control requests transmitted by the base transceiver station during a given time.

The attenuation of the attenuation means is altered adaptively, which helps prevent coverage area losses of the base transceiver station. The attenuation of the receiver is kept as high as possible. The attenuation is reduced to some extent when it is detected that a subscriber terminal is no longer able to increase its transmission power. When the sensitivity of the base transceiver station improves, the subscriber terminal can reduce its transmission power and thus causes less interference.

In adjusting the attenuation, the transmission frequency of transmitted power reduction requests is also taken into account as follows. When the number of power reduction requests transmitted to the subscriber terminal exceeds a predefined limit value, the receiver of the base transceiver station increases the attenuation it uses.

The effect of interference is also reduced by temporarily increasing the threshold level of activating the load control and admission control algorithms, when the size of the interference exceeds a pre-set limit. This way, the base transceiver station does not immediately need to disconnect connections, for instance, but the interfering element is provided some extra time to stop interfering. The method and system of the invention are especially suited for reducing the effect of interference caused by an adjacent channel.

BRIEF DESCRIPTION OF THE FIGURES

The invention will now be described in greater detail by means of preferred embodiments and with reference to the accompanying drawings, in which.

DETAILED DESCRIPTION OF THE INVENTION

Figure 1:
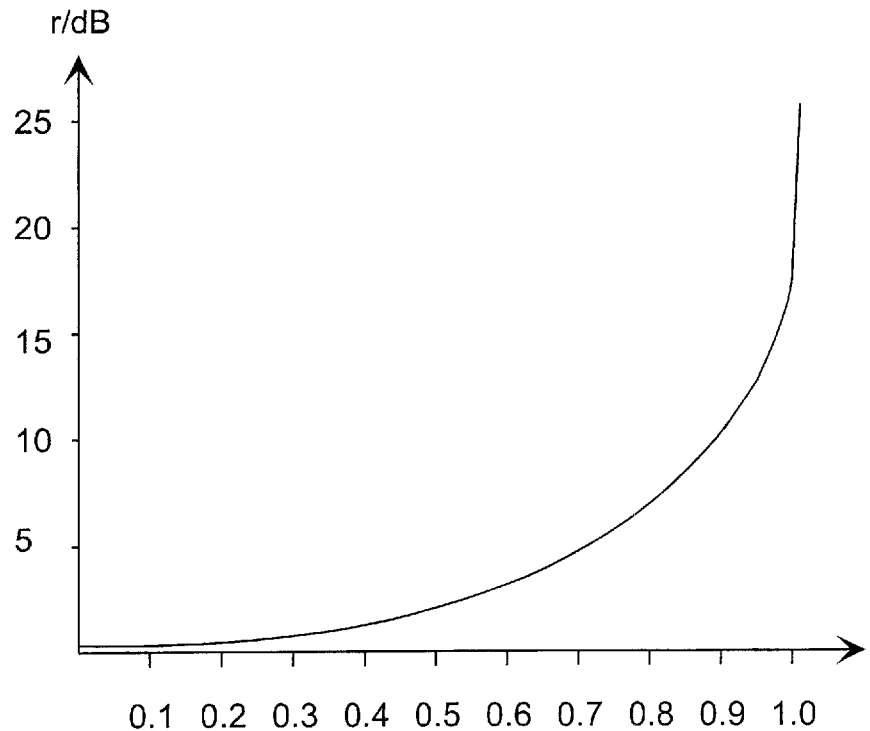
FIG. 1 is a curve showing the noise in a system as a function of the load.
Figure 2:
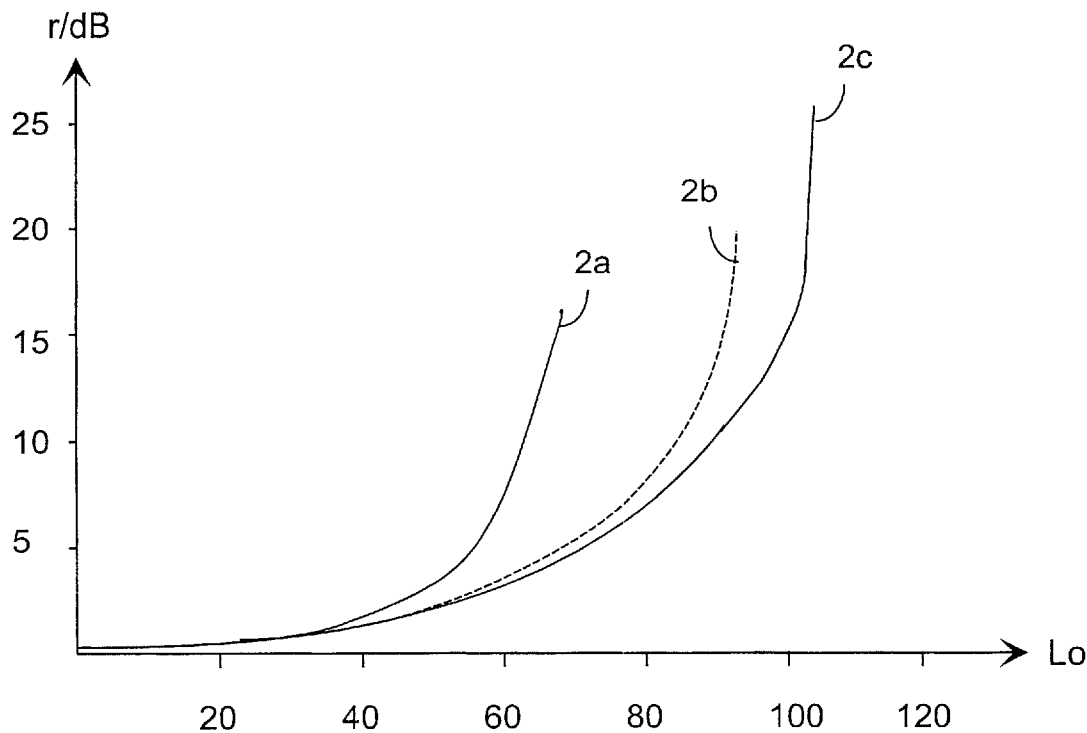
FIG. 2 shows load curves defined for different cell types.
Figure 3:
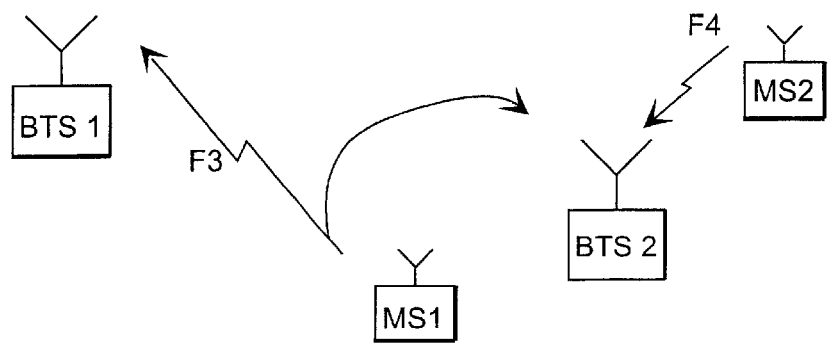
FIG. 3 shows a radio system.
Figure 4:
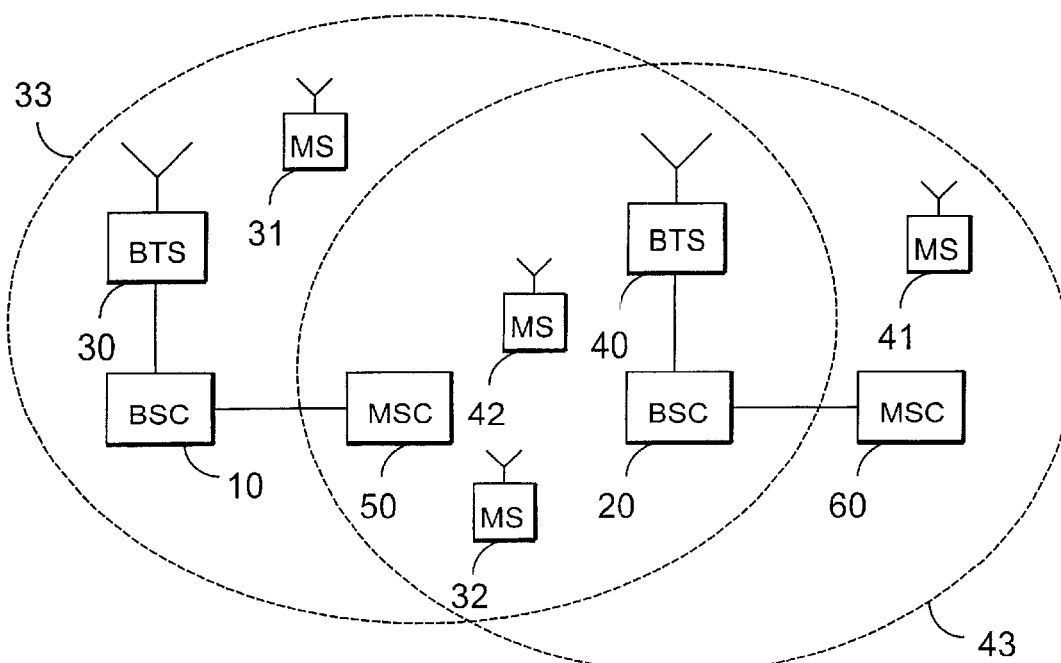
FIG. 4 shows a radio system.

FIG. 4 shows a radio system which comprises two base station controllers 10, 20, at least two base transceiver stations 30, 40, a group of subscriber terminals 31, 32, 41, 42, and two mobile switching centres 50, 60. The base transceiver station 30 is connected to the base station controller 10 which is connected to the mobile switching centre 50. The base transceiver station 40 is connected to the base station controller 20 which is connected to the mobile switching centre 60. The base transceiver stations and subscriber terminals act as transceivers.

The subscriber terminals 31, 32 are located in the service area 33 of the base transceiver station 30, which can form a macro cell, for instance. The subscriber terminals 41, 42 are located in the service area 43 of the base transceiver station 40, which can form a micro cell, for instance. The advantages provided by the present method come out especially well in a micro cell environment.

FIG. 4 shows that the service areas of the base transceiver stations overlap. The subscriber terminals 32, 42 are located in the overlapping area. If the system functioned in the desired manner, the signals transmitted by the subscriber terminals 31, 32 would be received by the base transceiver station 30 only, and the signals transmitted by the subscriber terminals 41, 42 would be received in the base transceiver station 40 only. However, the system does not in practice function in an optimal manner, since there are always different interfering elements in systems.

Base transceiver stations 30, 40 can be base transceiver stations of either the same operator or of different operators. In practice, the systems of different operators are also connected to each other through mobile switching centres, for instance, in which case it is possible for subscriber terminals in the systems of different operators to communicate with each other.

It is possible that adjacent channel interference occurs in a radio system, because the system design of different operators does not necessarily very well take into consideration the operating environment. Interference occurs especially when adjacent base transceiver stations use frequencies that are close to each other. The above-mentioned situation may well be possible, if the base transceiver stations belong to different operators. In practice, radio systems always suffer from adjacent channel interference to some extent, even though the base transceiver stations 30, 40 did belong to the same operator.

Figure 5:
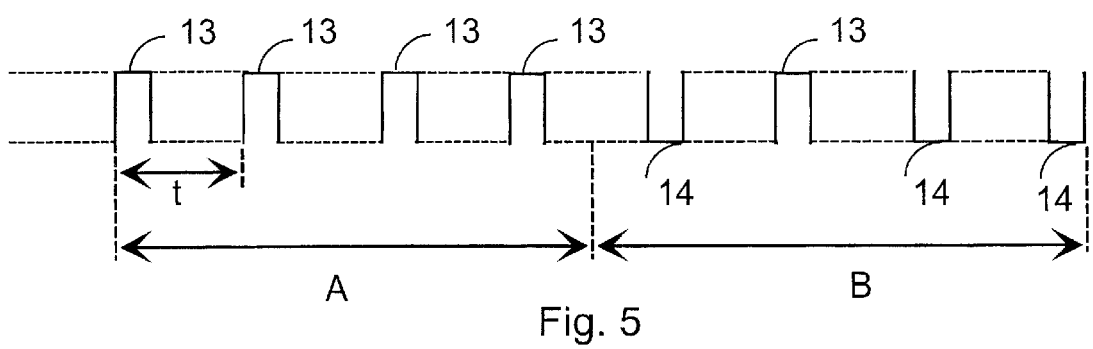
FIG. 5 shows power control requests.

FIG. 5 shows the location of power control requests in a transmitted signal. FIG. 5 shows that power control requests 13, 14 are transmitted at regular intervals during a connection. Power control is thus continuous in a CDMA system, for instance.

The transmission interval of power control requests, which is marked by the letter t in the figure, can be 0.625 ms, for instance. A power control request can comprise one bit, for instance. The request can be for power boost, for instance, when the value of the bit is 1. When the value of the bit is 0, it is for power reduction. The figure shows that the value of the bit used in the power control request 13 is 1. It also shows that the value of the bit used in the power control request 14 is 0.

FIG. 5 shows that during a time interval A, four power boost requests 13 are transmitted. It also shows that during a time interval B, one power boost request and three power reduction requests are transmitted. If it is assumed that the time intervals A and B are equal in length of time, it can be said that the transmission frequency of the power boost requests during the time interval A is higher than during the time interval B. The transmission frequency of the power boost requests is thus dependent on the number of boost requests transmitted during a certain time. The more power boost requests are transmitted during a certain time, the higher is the transmission frequency of the power boost requests. This also applies correspondingly to the power reduction requests.

Figure 6:
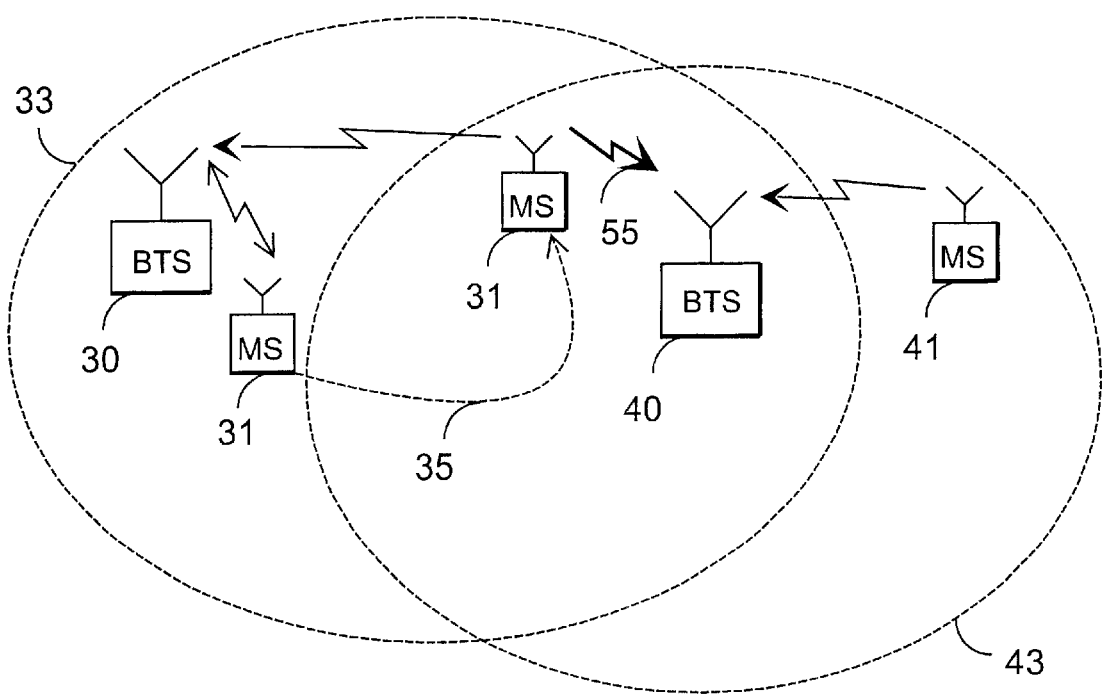
FIG. 6 shows a radio system.

FIG. 6 shows a preferred embodiment of a radio system. FIG. 6 is described with reference to FIG. 8 which shows frequency bands allocated to the base transceiver stations. In FIG. 6, the subscriber terminal 31, which is connected to the base transceiver station and 30 which uses the frequency band F3, propagates along the route 35 towards the base transceiver station 40. The figure also shows that the subscriber terminal 41, which uses the frequency band F4, is connected to the base transceiver station 40. Because the subscriber terminals 31, 41 use adjacent frequency bands, it is possible that a part of the signal intended for the base transceiver station 30 propagates instead to the base transceiver station 40.

In the situation of FIG. 6, the subscriber terminal 31 is moving away from the base transceiver station 30. In other words, the subscriber station is approaching the base transceiver station 40. When the subscriber terminal 31 moves away from the base transceiver station 30, the subscriber terminal 31 starts to send power boost requests to the base transceiver station 30. The base transceiver station 30 can increase its transmission power, for instance, on the basis of the requests it receives, in which case the signal transmitted by the base transceiver station 30 arrives at the subscriber terminal 31 at an as optimal level as possible in the situation.

In practice, the base transceiver station continuously measures the quality of the signals it receives and transmits power control requests as described above with reference to FIG. 5. When the base transceiver station 30 detects that the signals transmitted by the subscriber terminal 31 arrive too weak at the base transceiver station 30, the base transceiver station 30 transmits to the subscriber terminal 31 at least one power boost request.

The subscriber terminal 31 either boosts or reduces its transmission power on the basis of the power control requests transmitted by the base transceiver station 30. Power control aims at making sure that the base transceiver station receives the signals transmitted by different subscriber terminals as equal level in level as possible. Power control also aims at making SIR as optimal as possible in each situation. The further away from its base transceiver station the subscriber terminal moves, the more probably the subscriber terminal increases its transmission power. Naturally, at some point the maximum power limit of the subscriber terminal is reached, and the subscriber terminal is no longer able to increase its transmission power. When the subscriber terminal 31 moves away from the base transceiver station 30 and approaches the base transceiver station 40, the subscriber terminal starts to interfere the base transceiver station 40 more and more in the uplink direction.

Figure 7:
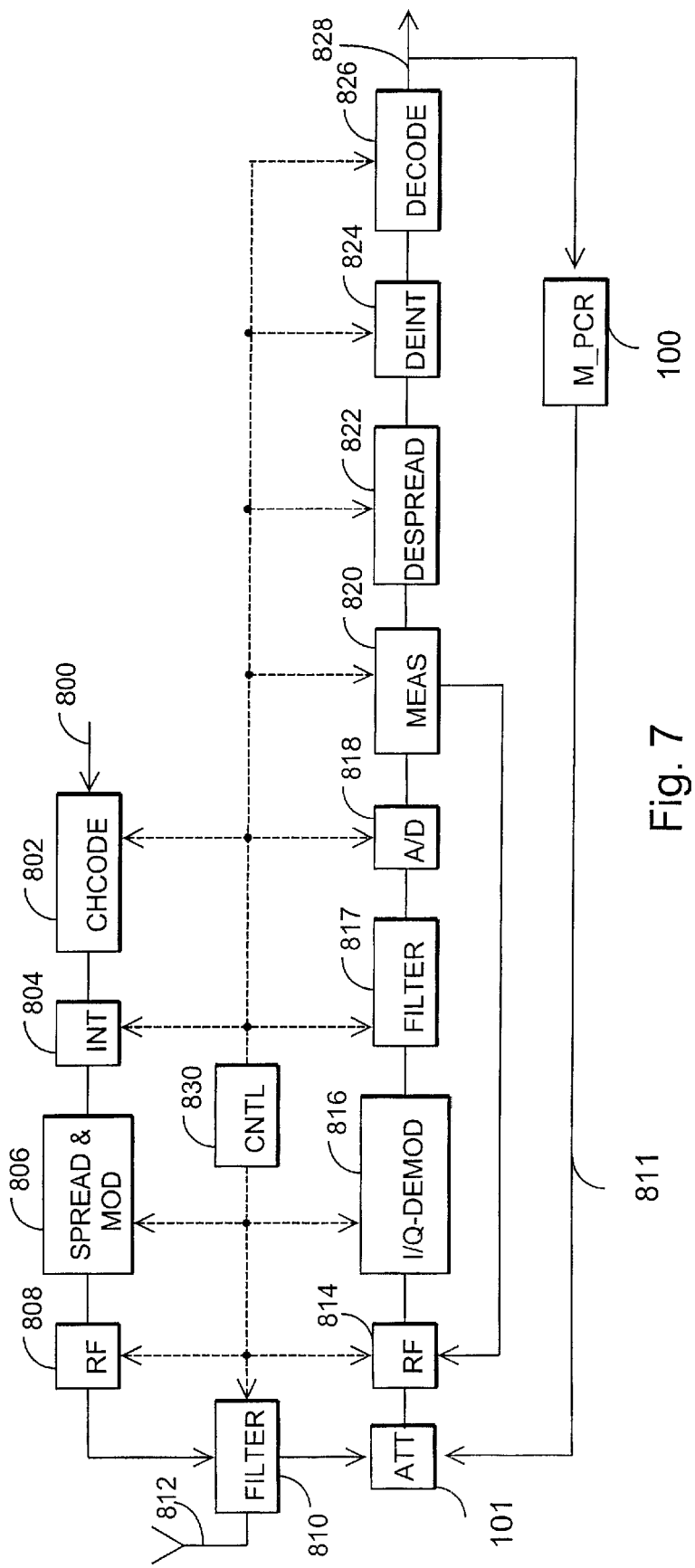
FIG. 7 shows a preferred embodiment of a base transceiver station.

FIG. 7 shows a preferred embodiment of a base transceiver station. It is a simplified structure which only shows the most essential blocks. The presented base transceiver station is preferably one employing the WCDMA principle, for instance. The base transceiver station comprises on the transmitter side a channel coder 802, an interleaver 804, a modulator 806, a radio frequency block 808, a filter 810, and an antenna 812. The filter 810 is in practice a duplex filter.

In the embodiment of FIG. 7, the transmitter side and receiver side of the base transceiver station use the same antenna 812. The base transceiver station also comprises a control means 830 which can, at least partly, be implemented by a processor and a suitable software. The control means also comprises logic circuits or ASIC circuits. The control means 830 controls the functions of both the transmitter side and the receiver side.

The following describes the operation of the transmitter side. A signal 800 is, after source-coding, taken to the channel coder 802. Channel coding includes different block codes, for instance, one example of which is the cyclic redundancy check (CRC). In addition, convolution coding and its different modifications, such as punctured convolution coding or turbo coding, are typically used.

The coded signal is taken on to the interleaver 804. The purpose of interleaving is to facilitate error correction. Owing to interleaving, a momentary fade in the radio path does not necessarily make the transmitted information unidentifiable. The signal is then spread with a spreading code, scrambled with a scrambling code and modulated in modulator 806. The modulated signal is taken to the radio frequency block 808 which can comprise different power amplifiers and filters limiting bandwidth. The analogue radio signal is transmitted through the filter 810 and antenna 812 to the radio path.

The structure of the receiver side is examined next. The receiver can be a RAKE receiver, for instance. FIG. 7 shows that the receiver side uses the same filter block 810 as the transmitter side. The receiver comprises a radio frequency block 814, a demodulator 816, a filter block 817, an A/D converter block 818, a measuring means 820, a block 822, a de-interleaver 824, and a decoder 826. In practice, the filter block 817 comprises at least two filters. In practice, the A/D converter block 818 comprises at least two A/D converters.

FIG. 7 also shows that the receiver side comprises an attenuation means 101 which is located between the filter block 810 and the radio frequency block 814. Further, the receiver side comprises a signal path 811 which connects the decoder 826 to the output side attenuation means 101 which alters its attenuation adaptively.

In the system of the invention, the frequency band can be either wideband or narrowband. The invention can be applied to systems using either type of frequency bands. Most preferably the invention is suited for wideband systems, such as the CDMA systems.

The following describes the operation of the receiver side. An analogue radio-frequency signal is received from the radio path by the antenna 812, from which the signal is forwarded to the filter 810. From the filter 810, the signal is taken to the attenuation means 101 which alters the attenuation it uses, if necessary. From the attenuator, the signal is taken to the radio frequency block 814 which preferably comprises a filter which filters away the frequencies external to the desired frequency band.

From the radio frequency block 814, the signal is transferred to the demodulator 816 which can be an I/Q demodulator, for instance. In the demodulator, the signal is transformed directly to a baseband, and the resulting signal is taken to the filter 817. The filter 817 preferably comprises low-pass filters of the I and Q branches. After filtering, the signal is sampled and quantized in one or more A/D converter blocks 818. After this, the strength of the signal can be measured in the measuring means 820. On the basis of the measuring result obtained from the measuring means, it is possible to control the automatic amplification control of the radio frequency block, for instance.

If the signal is a multipath-propagated signal, the signal components propagated along different paths are combined in the block 822 which according to prior art comprises several RAKE fingers. The signal components received by the RAKE fingers at different delays are searched for by correlating the received signal with the used spreading codes which have been delayed by predefined delays. When the delays of the signal components have been found, the signal components belonging to the same signal are combined. At the same time, the signal components are despread by multiplying the signal by the spreading code of the physical channel.

The thus obtained narrowband signal is taken to the de-interleaver 824 for de-interleaving. Next, the signal is taken to the decoder 826 which decodes the channel coding, for instance block coding and convolution coding, used in the transmission. Convolution coding is preferably decoded with a Viterbi decoder. The decoded signal 828 is forwarded to the other parts of the receiver.

Figure 8:
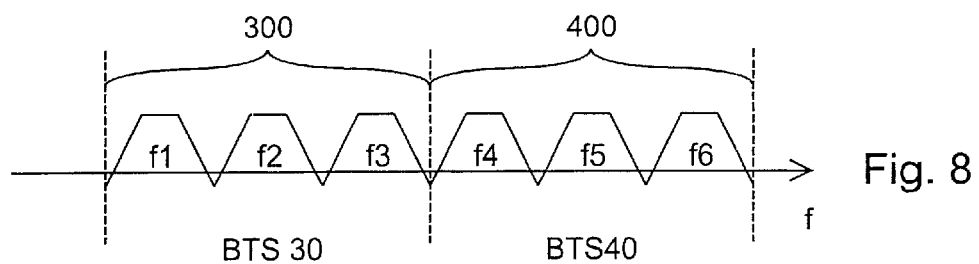
FIG. 8 shows the distribution of frequency bands between two base transceiver stations.

FIG. 8 shows the frequency bands allocated to the base transceiver stations. A frequency range 300 comprising frequency bands F1, F2, and F3 is allocated to the base transceiver station 30. A frequency range 400 comprising frequency bands F4, F5, and F6 is allocated to the base transceiver station 40. The frequency bands are located so that the frequency bands F3 and F4 are adjacent to each other. As a result of this, these adjacent frequency bands cause adjacent channel interference to each other. It should be noted that FIG. 8 shows frequency bands in the uplink transmission direction only. Frequency bands in the downlink direction are correspondingly located next to each other at a distance of a frequency interval from the frequency range of the uplink direction.

Figure 9:
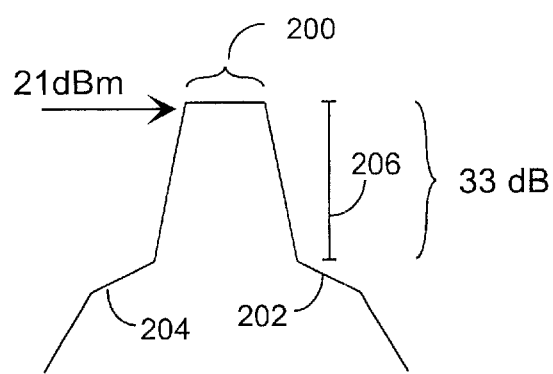
FIG. 9 shows a frequency band of a system.

FIG. 9 illustrates a frequency band of the system. A certain width 200 is reserved for the frequency band. As earlier noted, the non-linearities of transmitters make the transmitted signal spread to a wider frequency range than originally desired. The spreading of the frequency band can be seen in that side bands 202, 204 are formed at the edges of the frequency band. To save frequency resources, the frequency bands must be located next to each other and consequently, the side bands cause interference to the adjacent frequency bands.

FIG. 9 shows that the maximum power of the subscriber terminal is set to 21 dBm. The figure also shows that the attenuation of the adjacent channel is 33 dB. In practice, it can be assumed that the subscriber terminal can adjust its transmission power to a degree of 70 dB, for instance.

The power of the side bands is often referred to as ACP (adjacent channel leakage power). Said power is defined by comparing the power transmitted on the used frequency band 200 with the power transferred to the adjacent channel, and the difference 206 between the powers is the relative ACP. Both powers can be measured with a similar channel-wide filter.

In one embodiment, power control adjusts the signal transmission powers of all subscriber terminals so that each signal arrives at the base transceiver station at an optimal level below thermal noise. The more the level of the signal received by the base transceiver station exceeds the level of thermal noise, the more probable it is that the system enters an unstable state. The above-mentioned exceeding is obtained by the formula (1). Thermal noise can be calculated using the following formula:

$$N_0 = kTB_n, \quad (4)$$

wherein k is a Boltzmann constant ($k=1.38*10^{-23}$ WK$^{-1}$Hz$^{-1}$),

T is the temperature (290K),

Bn is the frequency band.

$$N_0 = 4.0*10^{-21}/1*10^{-3} \text{ W/mW} = 4*10^{-18},$$

$$10 \log (4*10^{-18}) = -174 \text{ dBm}.$$

The value of thermal noise is −108 dBm (−174 dBm/Hz+ 10 log 3.84 MHz=108 dBm), when the frequency band is 3.84 MHz.

Figure 10:
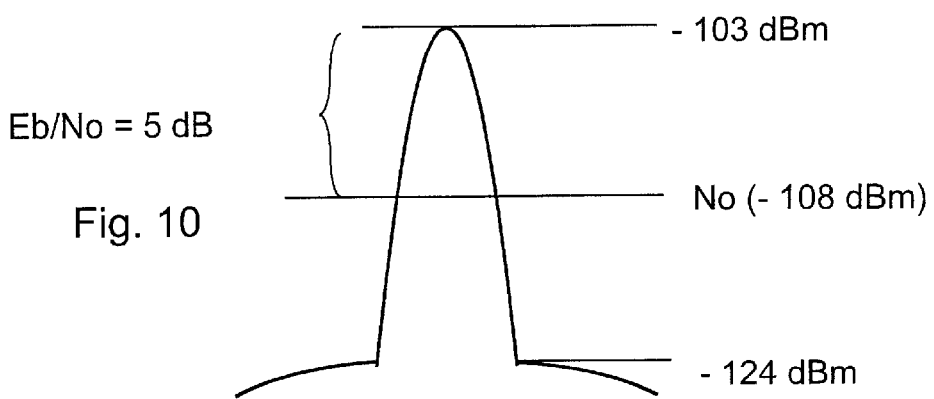
FIG. 10 shows a signal received by a receiver in comparison with thermal noise.

FIG. 10 illustrates a signal received by the receiver compared with thermal noise whose value is −108 dBm. In addition, it is assumed that $E_0/N_0$ is 5 dB and that the process gain is 21 dB. It can be determined from the figure that for an optimal operation of a radio network, a mobile phone should preferably adjust its transmission power in such a manner that a signal transmitted by a subscriber terminal arrives at the base transceiver station at a power level of −124 dBm.

Figure 11:
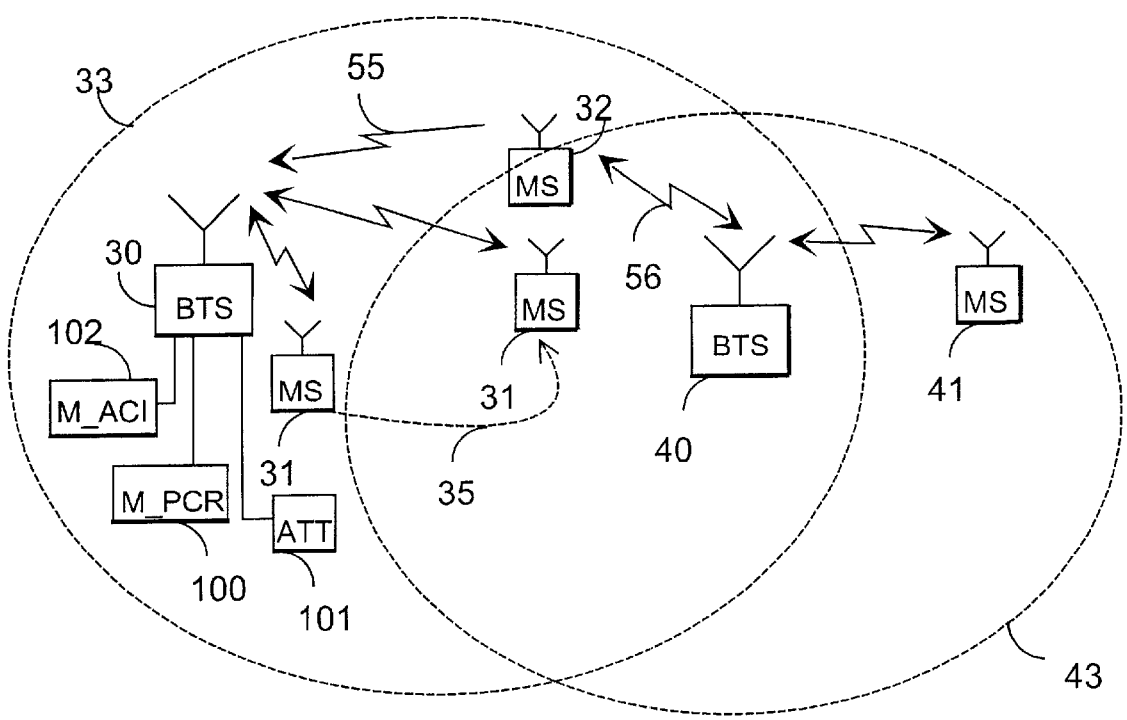
FIG. 11 shows a first preferred embodiment of a radio system.

FIG. 11 shows a radio system which comprises base transceiver stations 30, 40 and subscriber terminals 31, 32, 41. The subscriber terminal 32 is through a signal 56 connected to the base transceiver station 40, to which the subscriber terminal 41 is also connected. The subscriber terminal 32 disturbs the optimal operation of the base transceiver station 30 by an interfering signal 55. The base transceiver station 30 transmits power boost requests to the subscriber terminal 31, when the subscriber terminal 31 moves along a route 35 further away from the base transceiver station 30. The radio system comprises a measuring means 100 which records the transmission frequencies of power control requests of each base transceiver station separately.

FIG. 11 shows that the measuring means 100 is connected to the base transceiver station 30. The measuring means 100 can be located in a base transceiver station or in a base station controller (not, however, shown in the figure). The attenuation means 101 is, instead, preferably located on the receiver side of the base transceiver station. The measuring means 100 and the attenuation means 101 in the base transceiver station 30 belong to the first group of means in the radio system.

The measuring means 100 continuously records the number of power boost requests transmitted by each base transceiver station separately. The measuring means 100 also continuously records the number of power reduction requests transmitted by each base transceiver station separately. On the basis of the transmission frequency of the requests, the base transceiver station 30 can decide independently on altering the attenuation of the attenuation means 101 in its receiver. The measuring means 100 can, however, occasionally transfer the calculation data of the power control requests to the base station controller which can also make a final decision on altering the attenuation of the receiver of the base transceiver station. When the decision on altering the attenuation is left with the base station controller, the attenuation can also be adjusted as a function of the system capacity. For instance the number of base transceiver stations in the system affects the size of the system capacity.

If the same base transceiver station 30 transmits sufficiently many power boost requests during a predefined time to the subscriber terminal 31, it probably means that the subscriber terminal 31 can no longer increase its transmission power. Due to the above-mentioned situation, the base transceiver station 40 starts at a time instant to decrease the attenuation value of the attenuation means 101 in its receiver. The attenuation means 101 reduces attenuation when the transmission frequency of the power boost requests transmitted by the base transceiver station 30 is higher than a predefined transmission frequency of the power boost requests. Decreasing the attenuation value improves and increases the sensitivity of the receiver of the base transceiver station 30. A condition to begin decreasing the attenuation value can be that the reception band of the neighbouring base transceiver station 40 and the transmission band of the subscriber terminal 31 are adjacent frequency bands. Even though the invention is described as intended for reducing the effect of interference caused by an adjacent channel, the invention is also suited for reducing the effect of other types of interference.

When the subscriber terminal 31 connected to the base transceiver station 30 can no longer increase its transmission power, the sensitivity of the receiver of the base transceiver station 30 is altered adaptively. Sensitivity is altered by adaptively altering the attenuation of the attenuation means 101 in the base transceiver station. To be more precise, the sensitivity of the receiver is increased by reducing the attenuation of the attenuation means in the receiver. In practice, the attenuation is, however, kept as high as possible. The base transceiver station 30 thus decreases the attenuation value of the attenuation means 101 in its receiver, when it detects that the subscriber terminal 31 connected to the base transceiver station 30 can no longer increase its power. By altering the attenuation of the attenuation means 101, it is possible to reduce the disadvantageous effect of the interfering signal 55 transmitted by the subscriber terminal 32 on the operation of the base transceiver station 30 and on the operation of the subscriber terminals in the service area 33 of the base transceiver station 30.

Figure 12:
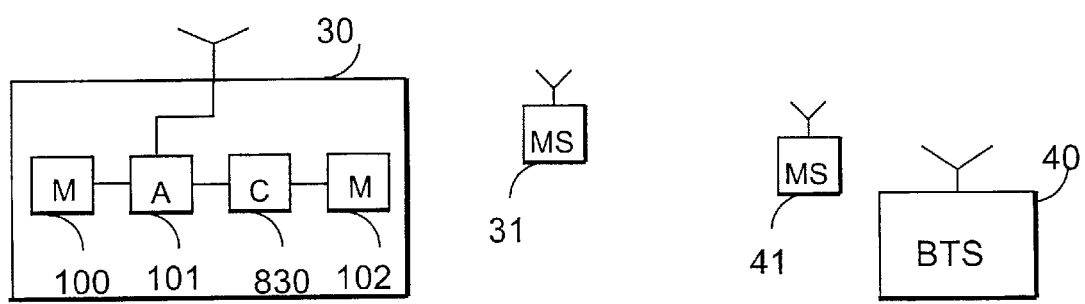
FIG. 12 shows a second preferred embodiment of a radio system.

FIG. 12 shows an embodiment of a radio system of the invention. The radio system comprises a base transceiver station 30 which comprises a measuring means 102 which defines the level of adjacent channel interference caused to the receiver of the base transceiver station 30. The measuring means 102 defines the level of the interference from ACP which is used by the measuring means 102 to calculate or estimate the level of the interference. The level of the interference can be revealed for instance by deducting the ACP power level from the power level of the received signal.

In principle, the functions of the measuring means 102 can be included in the measuring means 820 in the base transceiver station. The base transceiver station can change the admission control and/or load control algorithms, when the base transceiver station 30 receives from the adjacent channel interfering signals having too high a level. The purpose of use of the load control algorithm is to keep the network load at its optimum value. In practice, this means that the load is prevented from increasing too much. The measuring means 100 in the base transceiver station 30 can also make corresponding measurements as the measuring means 102, if necessary. In practice, the base transceiver station 30 and the base transceiver station 40 comprise the same functional blocks.

When the level of the interfering signal exceeds a predefined threshold value, the base transceiver station 30 raises the activation threshold(s) of the admission control and/or load control algorithms. The control means 830 changes the activation threshold of the algorithms controlling the operation of the base transceiver station 30, when the measuring result obtained from the measuring means 102 exceeds or is about to reach a pre-set limit value. The activation threshold of the algorithms can at least momentarily be raised. Even though the activation threshold is momentarily raised, the system does not enter an unstable state.

If, for some reason, the system does, however, enter an unstable state, it can then for instance disconnect the connection between the base transceiver station 30 and the subscriber terminal. If the level of the interfering signal is high, the control means 830 sets the activation threshold of the load control algorithm for a while to a state during which the algorithm can not be activated at all.

When the base transceiver station 30 changes the activation threshold level of said algorithms, a part of the connections of the base transceiver station 30 to the subscriber terminals in the service area may be disconnected. When the base transceiver station changes the admission control and/or load control algorithms, the base transceiver station can, at the same time, alter the attenuation value used by the attenuation means 101 of its receiver. The control means 830 and the measuring means 102 belong to the second group of means of the radio system. In practice, each base transceiver station 40 in the radio system comprises means corresponding to those of the base transceiver station 30.

In other words, the base transceiver station of the radio system has two groups of means available to it: a first and a second group of means. The base transceiver station does not, however, necessarily use the means of both groups at the same time. It can, however, use both groups at the same time. In other words, the same base transceiver station can change the sensitivity of its receiver and the activation threshold of the admission control and/or load control algorithms at the same time, if this is advantageous for the operation of the network.

In the method of the invention, the sensitivity of the receiver side of the base transceiver station is reduced at least until one subscriber terminal can no longer receive service from the base transceiver station.

Before the service stops, the base transceiver station has transmitted to said subscriber terminal power control requests, the number of which has exceeded a certain limit value. In the solution of the invention, the attenuation used by the receiver is slowly increased, which makes the receiver of the base transceiver station become more insensitive. During the control, which is preferably done nonstop, the attenuation is increased in small steps.

The sensitivity of the receiver of the base transceiver station is reduced as much as possible, but it is, however, kept at a value which ensures that the power of any of the subscriber terminals does not run out. In other words, the reduction of the attenuation is started to improve the sensitivity of the base transceiver station, when the radio system or the base transceiver station notices that a subscriber terminal can no longer increase its transmission power.

The attenuation means 101 in the radio system is arranged to increase the attenuation of the signals received by the base transceiver station until a subscriber terminal is close to not being able to receive or completely unable to receive the service provided by the base transceiver station. When a subscriber terminal is close to not being able to receive service, it starts to transmit power boost requests more frequently to the base transceiver station. The attenuation of the signals received from said subscriber terminal is then reduced in the base transceiver station.

The attenuation means 101 reduces the attenuation of the signals which arrive to the base transceiver station from the subscriber terminal, the transmission frequency of power boost requests transmitted to which by the base transceiver station exceeded a predefined transmission frequency of power boost requests. After reducing the attenuation, the attenuation means starts to increase the attenuation. The increase in attenuation can, for instance, start immediately after the reduction or some time after it. The attenuation means 101 increases and reduces attenuation preferably in steps. In increasing attenuation, a smaller attenuation step is typically used than in reducing attenuation.

In some embodiments, a problem may arise from the fact that a subscriber terminal in the immediate vicinity to its own base transceiver station cannot reduce its own power enough to make the power optimal in the receiver of the base transceiver station. This phenomenon may cause a reduction in the system capacity, because all other users may need to increase their power due to one user. To avoid this, the receiver of the base transceiver station increases the attenuation it uses, when the number of power reduction requests transmitted to a subscriber terminal exceeds a certain predefined limit value.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A method for minimizing the effect of interference in a radio system which comprises at least one subscriber terminal and a base transceiver station which receives signals from said subscriber terminal, the method comprising:

transmitting power control requests to said subscriber terminal, measuring separately the transmission frequency of power control requests transmitted to a subscriber terminal, and altering the attenuation of signals arrived at the base transceiver station at least in the case of the signals which are transmitted from the above-mentioned subscriber terminal to the base transceiver station, when the transmission frequency of the power control requests transmitted to the subscriber terminal exceeds a predefined transmission frequency of power control requests.

2. A method for minimizing the effect of interference in a radio system which comprises at least one subscriber terminal and a base transceiver station which receives signals from said subscriber terminal, the method comprising:

transmitting power control requests to said subscriber terminal, and at least one group of method steps of the following two method steps is additionally executed in the method;

in the first method step group:

measuring separately the transmission frequency of power control requests transmitted to each subscriber terminal, and altering the attenuation of signals arrived at the base transceiver station at least in the case of the signals which are transmitted from the above-mentioned subscriber terminal to the base transceiver station, when the transmission frequency of power control requests transmitted to the subscriber terminal exceeds a predefined transmission frequency of power control requests;

in the second method step group:

defining the size of interfering signals arrived at the reception band of the base transceiver station, changing the activation threshold of the algorithms controlling the operation of the radio system, when the measuring result from measuring the interfering signals exceeds a pre-set limit value.

3. A method as claimed in claim 1 or 2, wherein, increasing attenuation when the power control requests are power boost requests.

4. A method as claimed in claims 1 or 2, or wherein increasing attenuation until one subscriber terminal can no longer receive the service provided by the base transceiver station when the power control requests are power boost requests.

5. A method as claimed in claim 1 or 2, wherein increasing attenuation is increased until one subscriber terminal can no longer receive the service provided by the base transceiver station, when the power control requests are power boost requests after which attenuation is reduced in small steps.

6. A method as claimed in claim 1 or 2, wherein reducing attenuation when the power control requests are power reduction requests.

7. A method as claimed in claim 1 or 2, wherein in measuring the transmission frequency of the power control requests, measuring the number of power boost requests or power reduction requests transmitted to the subscriber terminal during a certain time.

8. A method as claimed in claim 1 or 2, wherein using a maximal attenuation value suitable to each situation in attenuation.

9. A method as claimed in claim 2, wherein the algorithm is a load control algorithm.

10. A method as claimed in claim 2, wherein the algorithm is an admission control algorithm.

11. A method as claimed in claim 2, wherein changing the activation threshold level of the algorithms to be higher.

12. A method for minimizing the effect of interference in a radio system which comprises at least one subscriber terminal and a base transceiver station which receives signals from said subscriber terminal, the method comprising:

transmitting power control requests to said subscriber terminal, measuring separately the transmission frequency of power control requests transmitted to each subscriber terminal, increasing the attenuation of signals received by the base transceiver station until one subscriber terminal can no longer receive the service provided by the base transceiver station, and thereafter reducing the attenuation of the signals arriving at the base transceiver station from the subscriber terminal, the signals being those arriving to the base transceiver station from the subscriber terminal, the transmission frequency of power boost requests transmitted to which exceeds a predefined transmission frequency of power boost requests.

13. A method as claimed in claim 12, wherein increasing and reducing attenuation in steps, and using a smaller attenuation step in increasing attenuation than in reducing attenuation.

14. A radio system which comprises at least one subscriber terminal and a base transceiver station which is adapted to receive signals from said subscriber terminal and which base transceiver station is adapted to transmit power control requests to said subscriber terminal, wherein the radio system comprises a measuring means which is adapted to measure the transmission frequency of power control requests transmitted to the subscriber terminal, and an attenuation means which is adapted to alter the attenuation of signals arriving at the reception band of the base transceiver station, which signals are transmitted by the subscriber terminal, the transmission frequency of power control requests transmitted to which has exceeded a predefined transmission frequency of power control requests.

15. A radio system which comprises at least one subscriber terminal and a base transceiver station which is adapted to receive signals from said subscriber terminal and which base transceiver station is adapted to transmit power control requests to said subscriber terminal, wherein the radio system has two groups of means available to it, the radio system comprising at least one of them at each time; and the first group of means comprises:
  a measuring means which is adapted to measure the transmission frequency of power control requests transmitted by the base transceiver station to each subscriber terminal, and
  an attenuation means which is adapted to alter the attenuation of signals arriving at the reception band of the base transceiver station, which signals are transmitted by the subscriber terminal, the transmission frequency of power control requests transmitted to which has exceeded a predefined transmission frequency of power control requests; and the second group of means comprises:
  a measuring means which is adapted to define the size of interfering signals arrived at the reception band of the base transceiver station,
  a control means which is adapted to change the activation threshold of the algorithms used in the radio system, when the result obtained from the above-mentioned definition of interfering signals exceeds a pre-set limit value.

16. A radio system as claimed in claim 14 or 15, wherein the attenuation means is adapted to increase attenuation when the power control requests are power boost requests.

17. A radio system as claimed in claim 14 or 15, wherein the attenuation means is adapted to reduce attenuation when the power control requests are power reduction requests.

18. A radio system as claimed in claim 14 or 15, wherein the attenuation means is adapted to maximize the attenuation value it uses at each time in attenuation.

19. A radio system as claimed in claim 14 or 15, wherein the measuring means is adapted to count the number of the power control requests which are power boost requests and transmitted during a certain time.

20. A radio system as claimed in claim 14 or 15, wherein the measuring means is adapted to count the number of the power control requests which are power reduction requests and transmitted during a certain time.

21. A radio system as claimed in claim 14 or 15, wherein the attenuation means is adapted to reduce attenuation, when the transmission power of the subscriber terminal is at maximum.

22. A radio system as claimed in claim 14 or 15, wherein the reduction in attenuation of the attenuation means is adapted to increase the sensitivity of the base transceiver station.

23. A radio system as claimed in claim 15, wherein the algorithm is a load control algorithm.

24. A radio system as claimed in claim 15, wherein the algorithm is an admission control algorithm.

25. A radio system as claimed in claim 15, wherein the control means is adapted to change the activation threshold level of the algorithms to be higher.

26. A radio system which comprises at least one subscriber terminal and a base transceiver station which is adapted to receive signals from said subscriber terminal and which base transceiver station is adapted to transmit power control requests to said subscriber terminal, wherein the radio system comprises a measuring means which is adapted to measure the transmission frequency of power control requests transmitted to the subscriber terminal, and
  an attenuation means which is adapted to increase the attenuation of the signals received by the base transceiver station until one subscriber terminal can no longer receive the service provided by the base transceiver station, and
  the attenuation means is adapted to reduce the attenuation of the signals transmitted from the subscriber terminal to the base transceiver station, which signals arrive to the base transceiver station from the subscriber terminal, the transmission frequency of power boost requests transmitted to which by the base transceiver station has exceeded a predefined transmission frequency of power boost requests.

* * * * *

UNITED STATES PATENT AND TRADEMARK OFFICE
CERTIFICATE OF CORRECTION

PATENT NO.    : 6,438,356 B1
DATED         : August 20, 2002
INVENTOR(S)   : Lilja et al.

It is certified that error appears in the above-identified patent and that said Letters Patent is hereby corrected as shown below:

<u>Title page,</u>
Item [30], please change Foreign Application Priority Data,
"Mar. 9, 2000   (FI) .............................. 2000539"
to
-- Mar. 9, 2000   (FI) .............................. 20000539 --

Signed and Sealed this

Twentieth Day of May, 2003

JAMES E. ROGAN
*Director of the United States Patent and Trademark Office*